United States Patent [19]

Brems

[11] 4,360,097
[45] Nov. 23, 1982

[54] PRECISION REGISTRY WITH LIFT AND CARRY TRANSFER SYSTEM

[76] Inventor: John H. Brems, 32867 White Oaks Trail, Birmingham, Mich. 48010

[21] Appl. No.: 196,216

[22] Filed: Oct. 14, 1980

[51] Int. Cl.³ .............................................. B65G 47/00
[52] U.S. Cl. .................................................. 198/345
[58] Field of Search ........................ 198/345, 774, 773

[56] References Cited

U.S. PATENT DOCUMENTS

| | | | |
|---|---|---|---|
| 3,155,217 | 11/1964 | Cross | 198/345 |
| 4,148,400 | 4/1979 | Cross | 198/774 X |
| 4,201,284 | 5/1980 | Brems | 198/345 |

Primary Examiner—John J. Love
Assistant Examiner—Paul A. Sobel
Attorney, Agent, or Firm—Barnes, Kisselle, Raisch & Choate

[57] ABSTRACT

In automation equipment, a system which utilizes work carrying pallets which provides for the locating and accurate locking of said pallets at a work station together with a lift and carry transfer means for the pallets which is operated in conjunction with the pallet clamping and locking system with a common actuator and a sequential actuation which includes lifting, lowering, locating and clamping.

13 Claims, 9 Drawing Figures

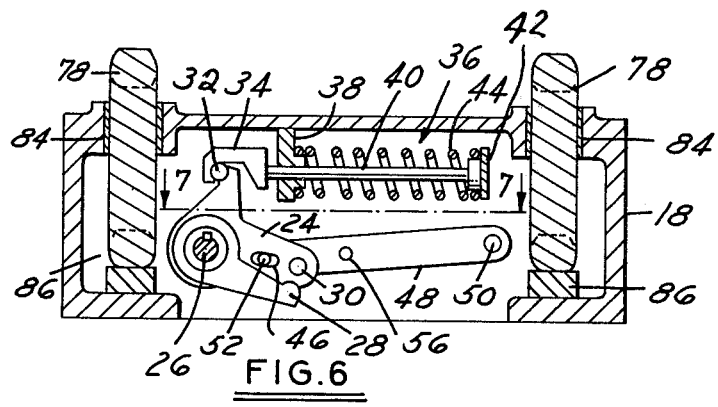
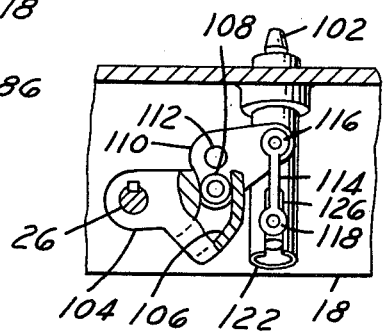
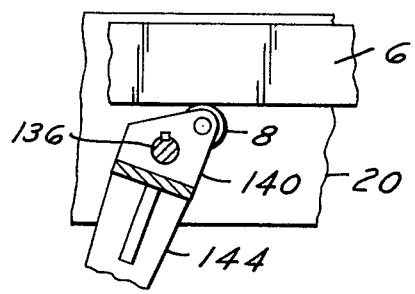
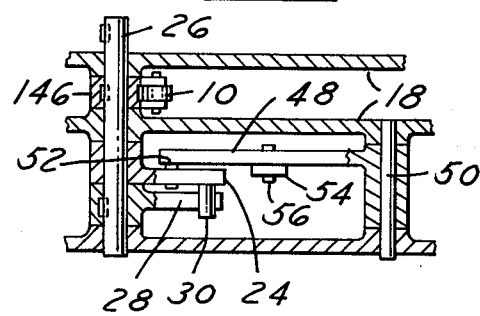
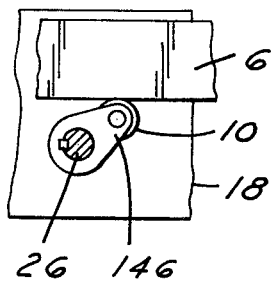
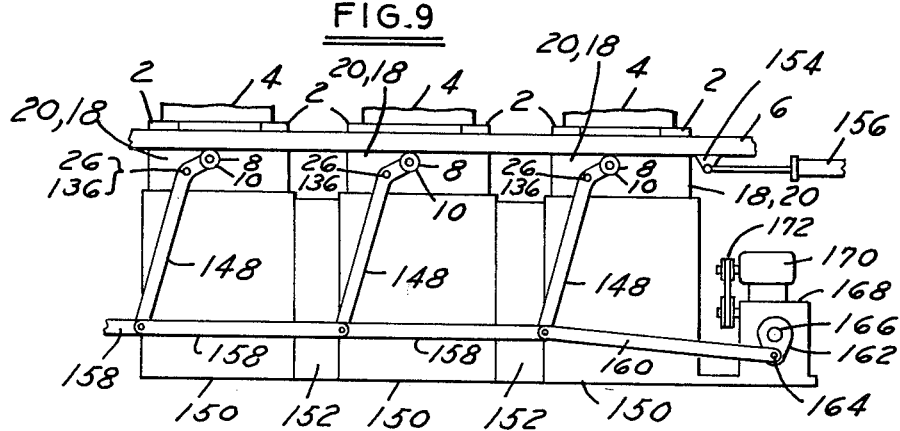

PRECISION REGISTRY WITH LIFT AND CARRY TRANSFER SYSTEM

FIELD OF INVENTION

Automation equipment utilizing work carrying pallets and locating devices for insuring accurate pallet location as each pallet comes to rest at a work station.

BACKGROUND AND OBJECTS OF THE INVENTION

In some types of automatic workpiece processing, the workpieces are located and clamped in movable fixtures known as pallets, which are progressively transferred from station to station of a multiple station transfer machine. In each station of such a multiple station machine, these pallets are located as accurately as possible and clamped by a mechanism referred to as a pallet registry. Once located, a machine adjacent the pallet performs a milling or drilling or other operation on the workpiece. The accuracy of the resultant operation is only as accurate as the location of the pallet and the workpiece.

A wide variety of types of registries have been in use in the industry for many years. Several such registry mechanisms are shown in U.S. Pat. Nos. 2,672,675; 2,673,386; 3,155,217; 3,571,872; 3,968,869; 4,148,400; 4,201,284, and my copending application, Ser. No. 164,092, filed June 30, 1980, which is a continuation-in-part of application, Ser. No. 950,318, filed Oct. 11, 1978. The location of a pallet with respect to a registry is generally accomplished with a pair of locating pins, vertically movable in the registry, which engage corresponding holes in each pallet. Slight errors of pallet location are inevitable because of the practical working clearances required between the locating pins and their guide sleeves in the registry frame, and between the locating pins and the corresponding holes in the pallet. These slight errors become progressively larger with usage due to pin, guide sleeve, and pallet hole wear.

It is one object of this invention to provide a pallet registry which is free of these initial working clearance type errors associated with locating pins, and, further to provide a pallet registry in which the location errors due to wear are significantly reduced.

It is often times convenient to rotate a pallet 90° about a vertical axis at some intermediate station as a pallet moves through the machine. This is generally done to bring otherwise inaccessible workpiece surfaces into position for processing by working stations which are disposed along either side of the line of pallet travel. It is another object of this invention to provide a pallet registry and pallet combination which is capable of precisely locating a pallet with respect to the registry in any one of four attitudes of the pallet which are created by rotation of the pallet in 90° increments about a vertical centerline.

The movement of pallets through a transfer machine is presently accomplished in one of two ways; they can be slid from station to station on fixed rails driven by a horizontally reciprocating transfer bar which selectively engages all pallets to move them in the forward direction, and is disengaged from the pallets during its return travel; or the pallets can be moved by a "lift and carry" mechanism from station to station by first being lifted by a set of transfer bars in a substantially vertical direction, then being moved forward with the transfer bars through a horizontal stroke equal to the station spacing, and finally being lowered by the transfer bars in a substantially vertical direction. The first slide system of pallet transferring requires only a simple reciprocating transfer bar and slide rails but has the disadvantage of locating the pallets along the vertical axis from the rails on which the sliding occurs and through the pallet feet which slide on the rails. Both the rails and pallet feet are very subject to wear, especially where dirt, dust and grit can accumulate on the rails, and this combined wear directly affects the accuracy of vertical pallet location. The lift and carry pallet transfer system eliminates the vertical location error problem due to wear, but at the expense of incorporating a more complex lift and carry type transfer system for the pallets.

It is another object of this invention to provide a greatly simplified lift and carry type pallet transfer system in which the lift motion for the transfer system is created by a simple addition to the registry actuation mechanism.

Other objects of this invention are to provide registries which may be grouped together to be operated by a single power source; to provide registries in which the clamps have a significantly greater movement range than those of present designs, to provide registries which do not utilize screws, wedges, or other low efficiency mechanisms in generating the clamping force, and to provide registries in which the bending loads due to clamping are primarily confined to members whose deflection does not affect the accuracy of pallet location, and in which the bending loads imposed on the locating and structural components of the registry are minimized to achieve lower deflections per unit of clamping force.

Other objects of this invention will be apparent in the following description and claims with the accompanying drawings in which there is disclosed the principles of operation of the invention and the best mode presently contemplated for the practice thereof.

BRIEF DESCRIPTION OF THE DRAWINGS

Drawings accompany the disclosure and the various views thereof may be briefly described as:

FIG. 4, a longitudinal vertical section taken on line 4—4 of FIG. 1.

FIG. 5, a partial longitudinal vertical section taken on line 5—5 of FIG. 2.

FIG. 6, a partial longitudinal vertical section taken on line 6—6 of FIG. 1.

FIG. 7, a partial horizontal section taken on line 7—7 of FIG. 4.

FIG. 8, a partial longitudinal vertical section taken on line 8—8 of FIG. 1.

FIG. 9, a schematic vertical section along a transfer line employing the registries.

DETAILED DESCRIPTION OF THE INVENTION AND THE MANNER AND PROCESS OF USING IT

The locating and clamping technique and the mechanism which produces it is similar to that disclosed in my U.S. Pat. No. 4,201,284. The novelty of the present invention lies in the technique and structure for actuating the locating and clamping mechanism and coordinating it with the lift system of a lift and carry pallet transfer system. The theory of the locating process is explained in detail in U.S. Pat. No. 4,201,284; this same locating process theory is applicable to this present invention.

Figure 1:
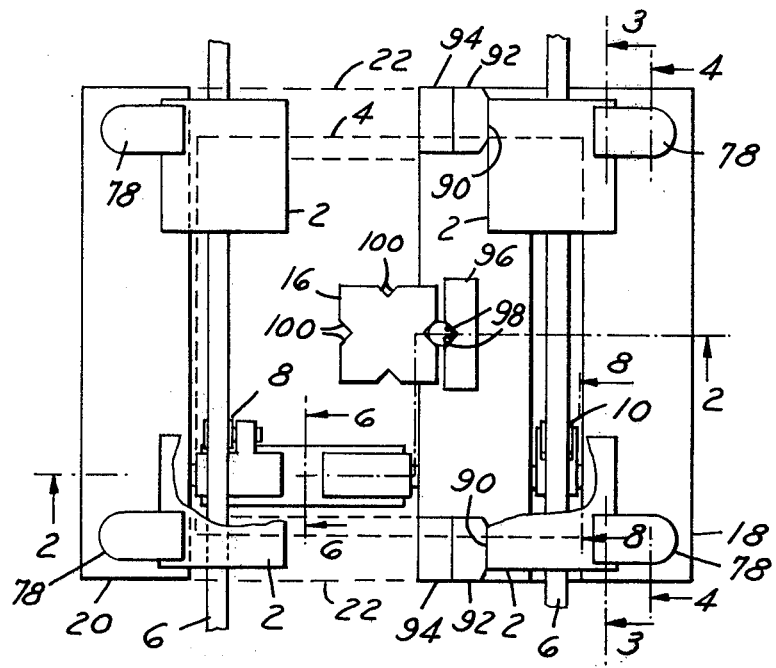
FIG. 1, a plan view of a pallet and registry mechanism.

FIG. 1 is a plan view of a pallet registry assembly on which are superimposed four pallet feet 2 mounted on the pallet base 4. The pallet 4 is moved from station to station by the lift and carry transfer bars 6 supported by the lift rollers 8 and 10 which are part of the registry system and whose mechanism and action will be subsequently described. The transfer bars 6 are driven through their horizontal stroke by a separate drive system such as shown in my U.S. Pat. No. 3,789,676. On the transfer bars 6 are mounted transfer pins 12 which engage holes 14 in the pallet feet 2 during the advance or forward stroke of the transfer bars 6. The transfer bars 6 are shown (FIG. 2) in their down position, and it is in this position that the transfer bars make their return stroke, not transporting the pallets. A pallet locator 16, having four sided symmetry is mounted to the pallet 4 to cooperate with the registry location system.

Figure 2:
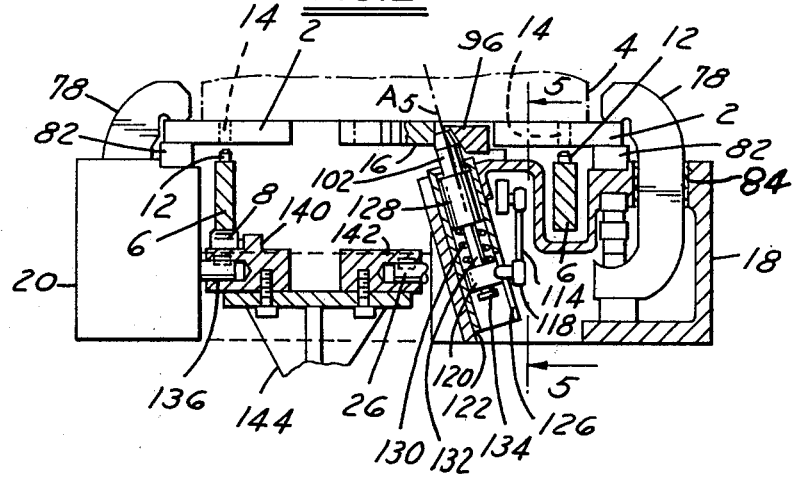
FIG. 2, a transverse vertical section taken on line 2—2 of FIG. 1.

A complete registry is made up of a primary housing 18 and a secondary housing 20 which optionally may be interconnected with integral tie bars 22 shown dotted in FIGS. 1 and 2. With the tie bars 22 present, the registry housing becomes a single unit which is advantageous in increasing the rigidity; however, with the tie bars absent, the secondary housing 20 and its contained mechanism may be removed from or replaced on the machine without removing the transfer bars 6. An interrelated locating and clamping system is contained within the primary housing 18, while a clamping system only is contained within the secondary housing 20.

Referring to the longitudinal sectional drawing, FIG. 4, and the horizontal sectional drawing, FIG. 7, a master bellcrank 24 is journalled on an input shaft 26. This bellcrank 24 is actuated by a drive lever 28 keyed to the input shaft 26; the drive lever 28 can drive the bellcrank 24 only in counterclockwise direction through a drive pin 30. The input shaft 26, in turn, is actuated in unison with the input shafts of all other registries by a system to be described.

The other arm of the bellcrank 24 is connected through a wear rod 32 to a nosepiece 34 of a spring cartridge 36. The spring cartridge 36 is comprised of a mounting bracket 38 which loosely guides a tension rod 40, which at one end is connected to the nosepiece 34 and at its other end mounts a spring seat 42. A coil compression spring 44 is preloaded and mounted between the bracket 38 and the spring seat 42. With the spring cartridge 36 not assembled into the registry, it can be seen that the travel of the spring 44 is limited by the contact between nosepiece 34 and mounting bracket 38. It is, therefore, possible, through the use of an external preload fixture, to precompress the spring 44 before fastening the nosepiece 34 or spring seat 42 to the tension rod 40.

It can be seen that the spring cartridge 36 exerts a clockwise torque on the bellcrank 24, while an upward movement of the drive arm 28 causes a counterclockwise movement of the bellcrank 24; and this in turn causes the tension rod 40 to move to the left further compressing the spring 44. The bellcrank 24 is shown in FIG. 4 in its most clockwise position, at which point the registry has lowered, located and clamped a pallet, as will be explained. When the drive arm 28 is rotated counterclockwise by the input shaft 26, the bellcrank 24 is positively driven in a counterclockwise direction through an angle of approximately 30° which unclamps the pallet 42, and disengages the locating system; it also delivers energy or work into the cartridge 36. As the drive arm 28 is rotated clockwise by the input shaft 26, the bellcrank 24 is rotated clockwise by the spring cartridge 36, locating and clamping the pallet 4 through the work output of spring 44. Each registry can therefore adapt to the various dimensional variations in the clamp system to achieve full clamp pressure.

Figure 3:
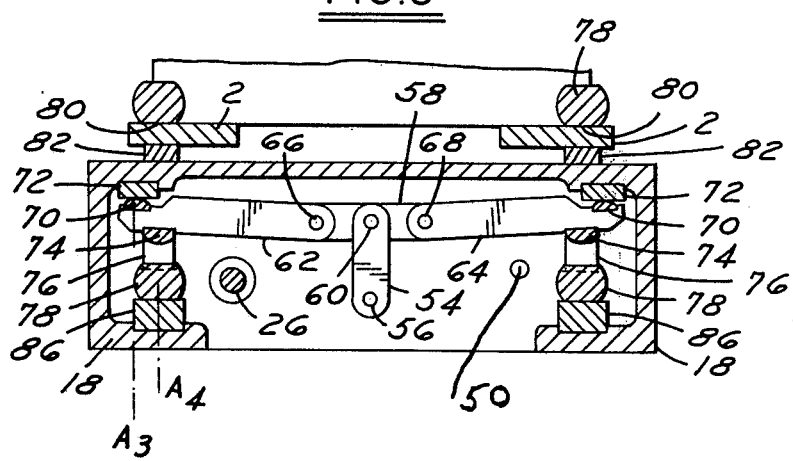
FIG. 3, a longitudinal vertical section taken on line 3—3 of FIG. 1.

The clamping system is shown in the longitudinal sections (FIGS. 3 and 4) and the transverse section (FIG. 2). The horizontal leg of the bellcrank 24 has formed into it an elongated slot 46. An intermediate link 48 is mounted on a shaft 50 journalled in the housing 18; the outboard end of the link 48 has mounted on it a coupling pin 52 which operates in the slot 46 in bellcrank 24. A tie link 54 is pivotally connected to the link 48 by a pin 56; at its other end (FIG. 3), the tie link 54 is pivotally connected to an equalizer link 58 by a pin 60; this connection to link 58 is at or near its midpoint. At its two ends, the equalizer link is connected to clamp levers 62 and 64 by pins 66 and 68 respectively. The two clamp levers are symmetrically opposite and each operates one of the two clamps.

The clamp lever 62, at its other end, has mounted on it a cylindrical insert 70 which rolls on a reaction pad 72 mounted in the housing 18. This slightly moving connection between the insert 70 and the reaction pad 72 is the fulcrum axis for the lever 62 and is noted as axis $A_3$. On the other side of the lever 62 is mounted a cylindrical insert 74 having a center on the clamp axis $A_4$. This insert 74 bears against the mating concave face of a shoe 76; the opposite face of the shoe 76 has a convex cylindrical face which mates with a concave face of the clamp member 78. This clamp member 78 has a "C" configuration, FIG. 2, with a substantially straight cylindrical body having an extended integral lower section which mates with shoe 76 and an extended integral upper section with a clamp face 80 which bears against the upper surface of the pallet foot 2 during clamping. The pallet foot 2, during clamping, is supported by locator pad 82 mounted on the housing 18. The cylindrical body of the clamp member 78 is guided in an elastomeric bushing 84, such as neoprene or urethane, mounted in the housing 18. The lower end of the clamp member 78 rests on an elastomeric pad 86, which functions as the clamp return element. The clamping components associated with the symmetrically opposite clamp lever 64 are identical with those associated with the clamp lever 62 as described above.

It will be recalled that the clamps are actuated by a clockwise rotation of the bellcrank 24; this causes pin 52 and pin 56 on link 48 to move downward. This movement is transmitted to the equalizer link 58 by tie link 54. It will be noted that the equalizer link 58 transmits this movement through pins 66 and 68 to clamp levers 62 and 64 respectively, and provides an equal force to these clamp levers 62 and 64. The clamp lever 62 rotates clockwise about the fulcrum axis $A_3$, and, through the shoe 76, forces the clamp member 78 downward, compressing the elastomeric pad 86 and closing the clearance between the upper surface of pallet foot 2 and clamp face 80. The clamp lever 64 rotates counterclockwise and actuates the clamp member 78 associated with it downward in an identical fashion. When both clamp members 78 are exerting their clamp force against the two pallet feet 2, the rotation of the bellcrank 24 is stopped, although a clockwise torque is still being applied to the bellcrank 24 by the spring cartridge 36. The clamp system is in equilibrium between the force of the spring cartridge 36 and the reactive force of the pallet feet back to the faces 80 of the clamp members 78. A highly reproducible clamping force is thereby attained. When this equilibrium condition is achieved, a small gap will appear between the drive lever 28 (FIG. 4) and the contact surface of pin 30. The magnitude of this gap is dependent on the various error and/or wear (stack up) of all the components involved in the clamping system including the pallet feet 2.

Several features of this clamping technique are to be noted. The clamping force applied to the clamp member 78 by the lever 62 through shoe 76 is applied on the same axis $A_4$ as is the clamp force applied by the clamp member 78 to the pallet shoe 2; i.e., these two forces act on coincident axes. The clamp member 78 will deflect slightly, but since it is mounted in the housing 18 through an elastomeric bushing, these deflections impose no significant loads on the housing 18. The only significant reactive loads on the housing 18 due to the clamping forces are a compressive load equal to the clamp force which exists between the locator pad 82 and the reaction pad 72 and a moment equal to the clamp force times the distance between axis $A_3$ and axis $A_4$; other much smaller forces are created by the reaction loads on shafts 26 and 50 and the spring cartridge support 38. These forces are considerably smaller because of the high mechanical advantage of clamp levers 62 and 64.

The unclamp sequence is caused by the counterclockwise rotation of shaft 26 and drive lever 28 (FIG. 4) which rotates bellcrank 24 counterclockwise and compresses spring 44. Bellcrank 24 in rotating counterclockwise lifts link 54 upward; this rotates clamp lever 62 counterclockwise and clamp lever 64 clockwise. The resilient pads 86 expand upward forcing the clamp members 78 to move up as permitted by the shoe 76. The clamp members 78 relieve their clamp force on the pallet shoes and continue upward to create a clearance between the upper faces of the pallet feet 2 and the clamp faces 80 of the clamp members 78.

In addition to the clamping function generated by the rotation of the input shaft 26, the locating sequence is also operated thereby. As a pallet 4 is moved into a given registry by movement of the transfer bars 6 and lowered, as will be described, the inner vertical faces 90 of two pallet feet 2 either clear or lightly contact two Y axis locators 92 mounted on upward extending protrusions 94 on the housing 18 (FIG. 1).

Referring to FIGS. 1 and 2, a fixed locator 96 is mounted to the housing 18; this locator 96 has two accurately positioned faces 98 which are inclined to a line perpendicular to the plane of locators 92, in any horizontal plane, and which are also inclined with respect to the vertical Z axis. A corresponding locator 16, previously noted, is mounted on the underside of the pallet base 4. This locator has four sides which are symmetrically disposed about the central vertical axis of the pallet. Only one of these sides is relevant to the location of a pallet in any one given attitude, that side which is parallel to and adjacent to the locator 96 on the housing 18. Considering this one side only, it has two accurately positioned vertical faces 100 which are inclined to a line perpendicular to the plane of the locating surfaces 90 on feet 2, in any horizontal plane; they may also be inclined with respect to a vertical axis. The inclination of the faces 100 on locator 16 and faces 98 on locator 96 are such that they can be mutually tangent to a cone having a bisecting axis, if the locator 16 is properly aligned with the locator 96 in the X plane.

A conical locator 102 in the form of a frustcrum of a cone is moved along the bisecting axis $A_5$ into and out of the four-sided pyramidal interspace created by faces 98 on locator 96 and faces 100 on locator 16 by a mechanism actuated by the rotation of the input shaft 26. Referring to FIG. 5, a cam arm 104 mounted on the input shaft 26 has cut into it a contoured cam groove 106 in which is guided a cam follower roller 108. This roller 108 is mounted on a bellcrank 110 which is mounted on a shaft 112 journalled in the housing 18. A link 114 operating in a substantially vertical plane is connected at its upper end to the bellcrank 110 through a spherical bearing 116. Referring also to FIG. 2, the lower end of link 114 is connected through a spherical bearing 118 to a sliding driver sleeve 120. This sliding driver sleeve 120 is mounted in a long bushing 122 in which the sleeve 120 can slide along axis $A_5$. It will be noted that the spherical bearing 118 is connected to the sleeve 120 through a boss 124 on the sleeve 120 which extends through a slot 126 in the bushing 122 (FIG. 5).

A secondary sliding member 128 is also slideably mounted in the brushing 122; it is connected to the sleeve 120 through a compression spring 130 and a preload rod 132. The preload rod 132 is concentrically mounted in the sliding member 128 and passes through a loose fitting hole in the sleeve 120, below which a head 134 is formed on the rod 132. This rod 132 is used to create a predetermined preload on the spring 130.

The conical locator 102 is mounted to the top of the sliding member 128 in a manner that permits it to float transversely thereon. This type of mounting permits the float required of the conical locator 102 and also permits it to rotate for uniform wear distribution.

The mechanism position shown in FIGS. 2 and 5 shows the input shaft 26 rotated to its full clockwise position. During the unclamp cycle, the input shaft 26 rotates counterclockwise carrying the cam arm 104 with it. It can be seen that after approximately midstroke, the cam roller 108 is moved to the left by cam groove 106 as viewed in FIG. 5; this causes a clockwise rotation of the bellcrank 110 about the axis of shaft 112. The link 114 moves downward driving the sleeve 120 downward also. After a very short downward movement of the sleeve 120, during which interval the spring 130 expands, the sleeve 120 contacts the head 134 of the rod 132. From this point onward, the sleeve 120, sliding member 128, and conical locator 102 move downward together, until the conical locator 102 is completely clear of the locators 16 and 96; this corresponds to the full counterclockwise position of the input shaft 26.

The locating sequence is the exact converse. This occurs during the clockwise rotation of the input shaft 26. During approximately the first half of this rotation, the cam roller 108 is driven to the right as viewed in FIG. 5; this causes the bellcrank 110 to rotate counterclockwise about the axis of shaft 112 raising the link 114. The sleeve 120, spring 130, sliding member 128, and conical locator 102 move upward together as driven by link 114. The conical locator 102 forces the pallet 4 into its final located position, at which time it is simultaneously tangent to all four faces 98 and 100 and its further upward movement is prevented. The preloaded spring 130 is then compressed slightly as the sleeve 120 is driven to the top of its stroke by the link 114, bellcrank 110, cam follower 108, and cam groove 106. This compression of spring 130 serves two useful purposes; it limits the upward force exerted by the conical locator on the locators 16 and 96, and it automatically compensates for the wear on all three locators 16, 102 and 96.

The conical locator 102, in being permitted to float with respect to sliding member 128, establishes a position for the pallet locator 16 relative to the locator 96 on the registry such that the conical locator 102 is simultaneously tangent to the two faces 100 and the two faces 98. The pallet location is determined solely from the locator 96 and slight errors or wear in the lift and guidance mechanism for the conical locator 102 is of no consequence.

It can be seen from the shape of the cam groove 106 that the raising of the conical locator 102 and its associated mechanism is generated during approximately the first half of the clockwise rotation of the input shaft and cam arm 104. During the remaining approximate half of the clockwise rotation of the input shaft 26 and cam arm 104, the cam roller 108 is in dwell and no further motion of the bellcrank conical locator 102 and intermediate details takes place. During this interval of the cam arm 104 rotation, the cam roller 108 engages a portion of the cam groove which is a true radius about the centerline of shaft 110. This is desirable since it insures that the conical locator 102 has fully located the pallet before the clamp members 78 clamp the pallet feet 2, and that no motion of the locating system occurs during the clamping process.

As described above, the primary housing 18 contains an interrelated locating and clamping mechanism. The mechanism housed within the secondary housing 20 is substantially identical with the clamping mechanism only, housed within the primary housing 18; there is no locating mechanism within this secondary housing. The secondary housing contains the spring cartridge and clamp mechanism shown in FIGS. 3 and 4 but does not contain the locating mechanism shown in FIG. 5. The input shaft 136 (FIG. 2) is shortened and the cam arm 104 and its associated following mechanism does not exist in the secondary housing. It will be noted that input shafts 26 and 136 rotate on a common axis.

It can be seen from the plan view, FIG. 1, that the pallet base 4 has four way symmetry, the pallet could be rotated 90° and appear exactly as it does before rotation. This condition is created by having four symmetrically disposed pallet feet 2 mounted equidistant from the pallet centerline, and by designing the pallet locator 16 such that it has four identical sides, each with the angled locator faces. Therefore through the use of suitable rotate-stations positioned as required along the line of travel of the pallets as they move through a multiple station transfer machine, the pallets may be rotated in 90° intervals and still be located and clamped by the aforesaid registry mechanism. This technique is very useful in that it makes workpiece faces accessible for operations that would otherwise require refixturing.

That portion of the registry mechanism housed within the primary housing 18 and the secondary housing 20, which is comprised of locating and clamping mechanisms as described above, is substantially identical with the locating and clamping mechanisms disclosed in my U.S. Pat. No. 4,201,284. The only significant difference in the mechanisms described herein from those in the referenced patent is in their method of actuation; whereas in the referenced patent, the mechanisms were actuated by push rods, the clamp mechanisms described herein are actuated by a rotation of the input shafts 26 and 136 through the "lost motion" connection of drive lever 28 to master bellcrank 24, while the locator mechanism is driven directly by the rotation of input shaft 26 through cam arm 104. This actuation of the locating and clamping mechanisms, through the rotation of input shafts 26 and 136, is relevant since it permits the direct coupling of the lift system of a lift and carry pallet transfer system as described below which is included in the present invention.

Referring to FIGS. 1, 2 and 6, a drive block 140 is keyed to the secondary input shaft 136; similarly, a drive block 142 is keyed to the primary input shaft 26. Both drive blocks are bolted to an actuator arm 144, which is driven by a common linkage mechanism to be described. The lift roller 8, supporting one of the transfer bars 6, is mounted on the drive block 140. Referring to FIGS. 1, 2, 7 and 8, the other lift roller 10 is mounted on a lift arm 146 which is keyed to the primary input shaft 26. Both lift rollers 8 and 10 are mounted to their respective block 140 and arm 146 at an equal distance from the axis of the input shafts 26 and 136 and in an identical angular relationship with respect to those shafts; the axes of rollers 8 and 10 are therefore coincident.

It can be seen that the assembly made up of actuator arm 144, blocks 140 and 142, input shafts 26 and 136, arm 146, and rollers 8 and 10 may rotate as a rigid assembly about the axes of the input shafts 26 and 136. This rigid assembly will be referred to as the actuator assembly 148.

Referring to FIG. 9, a schematic vertical section through three stations of an illustrative transfer machine, three center bases 150 are interconnected by tie bars 152. Each center base 150 supports a primary registry housing 18 and a secondary registry housing 20. The transfer bars 6 are supported by the rollers 8 and 10 on the actuator assemblies 148. At one end the transfer bars 6 are driven by an illustrative mechanism comprised of a drive bracket 154, and drive cylinder 156, which is clevis or trunnion mounted to accommodate the small vertical motion of the transfer bars 6. A variety of reciprocating drive mechanisms may be used in place of the cylinder 156 such as the mechanism of my U.S. Pat. No. 3,789,676 with a suitable connector link to accommodate a small vertical motion.

The lower ends of the actuator assemblies 148 are connected together by multiple pin connected links 158; this parallelogram linkage assembly is driven by a driver link 160 which in turn is driven by a crank 162 and crankpin 164. The crank 162 is mounted on the output shaft 166 of a gear reducer 168. The gear reducer is driven by an electric motor 170 through belts and pulleys 172. This drive mechanism comprised of the crank, gear reducer, motor and associated items 162-172 is again illustrative only. A cylinder or other suitable prime mover system can also be used.

The mechanism assembly of FIG. 9 is shown with the crank 162 in the 6 o'clock position, i.e., with the crankpin 164 directly below the shaft 166 which is the approximate midstroke of the mechanism. With the crank 162 in the 3 o'clock position, i.e., with the crank 162 in the horizontal position and the crankpin 164 to the right of the shaft 166, the actuator assemblies 148 are in their most counterclockwise position about their axes of rotation, shafts 26 and 136. In this position, the rollers are in their highest position together with the transfer bars 6 and the pallets are slightly lifted from the locator pads 82 in the registries. With the transfer bars 6 in this full up position, the transfer pins 12 have engaged the holes 14 in the pallet feet 2. It will be recalled that with the shafts 26 and 136 in their full counterclockwise position, the clamp members 78 are fully disengaged from the top of the pallet feet 2 and that the cam arm 104 has pulled the conical locator 102 to its full down position at which point it is clear of the pallet locator 16. With the registries and the associated transfer bar in the aforementioned positions, the cylinder 156 extends to advance all pallets one station forward.

At the completion of this forward stroke, the crank 162 is rotated afrom the 3 o'clock position to the 9 o'clock position, i.e., with the crank 162 horizontal and the crankpin 164 to the left of the shaft 166. This moves the actuator assemblies 148 to their most clockwise position about their axes of rotation, shafts 26 and 136, and lowers the rollers 8 and 10 and the transfer bars 6 supported thereon to their lowermost position as shown in the sectional view (FIG. 6).

During the rotation of the crank 162 from the 3 o'clock position to the 9 o'clock position, and the movement of the actuator assemblies 148 from their most counterclockwise position to their most clockwise position, the following events take place in this specific sequence:

1. The rollers 8 and 10 move downward, lowering the transfer bars and pallets until the pallet feet 2 contact the locator pads 82, whereupon the pallet becomes supported by these locator pads while the rollers 8 and 10 and transfer bars 6 continue downward;
2. During this same interval, the conical locator 102 was moving upward, but it does not contact either the fixed locator 96 or the pallet locator 16 until shortly after the pallet has become supported by the locator pads 82 as noted above. Simultaneously, the clamp members 78 were moving downward but they do not contact the top of the pallet feet 2 until after the conical locator 102 has reached the top of its stroke, and has located the pallet and is in dwell;
3. In essence then all three movements, lower pallet, raise conical locator and lower clamp members, begin simultaneously but end in the following sequential order: pallet supported by locator pads, pallet located by conical locator, and pallet clamped by clamp members.

With the transfer bars 6 in their lowermost position, the transfer pins 12 are clear of the holes 14 in the pallet feet 2, and the transfer bars 6 are returned or retracted to their starting position by the cylinder 156. It is also during this interval that the work is performed on the workpieces in the pallets in the various stations.

At the completion of this work cycle, and after the return of the transfer bars 6, the crank 162 is rotated from the 9 o'clock position to the 3 o'clock position. This unclamps the registries, withdraws the conical locator and lifts the rollers, transfer bar and pallet from the locator pads, ready for the next forward stroke of the transfer bars 6.

It can be seen that the motion of the transfer bars 6 is a true lift and carry system for the pallets and that the lift and lower motion of the transfer bars is automatically controlled and actuated by the inherent actuating mechanism for the registries themselves. This is accomplished by utilizing a shaft type input for the registries which is transverse to the direction of pallet transfer through the machine, and adding two rollers offset from the centerline of the shafts such that the shaft rotation generates the amount of lift required.

I claim:

1. In a lift and carry mechanism for a transfer line of the type having a plurality of pallet locating stations, and a pallet locating mechanism, a pallet clamping mechanism, and a rail lift mechanism at each station, and lift and carry rails extending between stations, that improvement which comprises:
    (a) a frame at each station,
    (b) an individual actuating shaft extending in a direction transverse to said rails and the direction of movement of pallets between said stations and mounted in said frame for rotation at each pallet station,
    (c) means for driving said shaft in opposite directions of rotation,
    (d) means driven by said shaft to operate a clamping mechanism at each station,
    (e) means driven by said shaft to operate an advanceable and retractable pallet locating mechanism at each station,
    (f) means fixed to said shaft and movable therewith to serve as a rail lifting mechanism at each station,
        said means being mechanically coordinated wherein when said shaft is driven by said driving means in one direction of rotation at each station there will be an initiation of operation of each of said means and sequentially effect release of said clamping mechanism, retraction of said locating mechanism, and lifting of said transfer rails, and when said shaft is driven by said driving means in the other direction of rotation, there will be a sequential lowering of said rails, advancement of said locating mechanism to a locating position, and actuation of said clamping mechanism to a clamping position.

2. A lift and carry mechanism as defined in claim 1 in which said rail lifting mechanism at each station comprises means eccentrically mounted on said shaft and movable with said shaft when driven by said driving means to a rail lifting and a rail lowering position.

3. A lift and carry mechanism as defined in claim 1 in which the driving means is a crank lever fixed on said shaft, and said means eccentrically mounted on said shaft comprises an extension of said lever positioned to contact said rails.

4. In a multiple station transfer machine in which workpieces are located and supported in pallets and in which said pallets are transferred from station to station by lift and carry transfer bar means along a transfer line and precisely located by registry means in each station for a work operation and in which said registry means includes:
    (1) a registry frame,
    (2) support means for pallets at each station on said frame,
    (3) two fixed spaced lateral locator surfaces on said frame at each station,
    (4) two fixed lateral locator surfaces on each pallet spaced similarly to those on the frame,
    (5) a first lateral force application surface on said frame spaced between said locator surfaces on said frame and a predetermined distance away from a line connecting said locator surfaces, (6) a second lateral force application surface on each said pallet located to register substantially with said first lateral force application surface when a pallet is brought to a particular station, (7) each said lateral force application surface presenting non-parallel spaced areas angled with respect to each other and angled obliquely with respect to the line connecting said locator surfaces, and (8) means to interfit complementally with said spaced areas of said first and second lateral force application surfaces and movable into engagement with said first and second surfaces to move said force application surfaces with respect to each other to move a pallet into a proper registry position wherein said lateral locator surfaces of said frame and a pallet are in positive contact, and said first and second force application surfaces are positioned in desired final registration with respect to each other, that improvement which comprises:
(a) actuating means for said registry means comprising a shaft rotatable about an axis substantially perpendicular to the line of transfer of said transfer machine, and
(b) lift means mounted with an offset on said rotatable shaft and adapted to support said transfer bar means.

5. A transfer machine as defined in claim 4 in which said lift means comprises rollers to support said transfer bar means in the lifted position to facilitate lineal motion of said bar means.

6. In a multiple station transfer machine in which workpieces are located and supported in pallets and in which said pallets are transferred from station to station by lift and carry transfer bar means along a transfer line and precisely located by registry means in each station along an X axis which is parallel to the direction of pallet transfer, and along a Y axis which is perpendicular to the direction of pallet transfer, and along a Z axis which is generally vertical and perpendicular to said X and Y axes, and angularly located about said X, Y and Z axes and in which said registry means includes:
(a) a registry frame,
(b) locating means comprising:
 1. support means for said pallet on said frame,
 2. two fixed pallet Y locator surfaces on each pallet lying substantially in the X-Z plane,
 3. two fixed registry Y locators on said registry frame lying substantially in the X-Z plane,
 4. a pallet X-Y locator on each said pallet incorporating two locating faces oppositely inclined to said Y axis,
 5. in registry X-Y locator on said registry frame incorporating two locating faces oppositely inclined to said Y axis, and
 6. a tapered locator mounted for movement in said registry frame and adapted to enter the interspace between said faces of said X-Y locators thereby forcing said pallet X-Y locator into a predetermined relationship with said registry X-Y locator and forcing said pallet Y locators into contact with said registry Y locators establishing a precise predetermined position of said pallet relative to said registry frame, that improvement which comprises:
(a) rotatable actuating means for said registry means, mounted thereon, and (b) lift means mounted on said actuating means and adapted to support said transfer bar means,
whereby said lift means and said registry means are interrelated for motion such that said lift means lowers said transfer bar means and said pallet supported thereon to cause said pallet to become supported by said support means prior to the operation of said tapered locator.

7. A multiple station transfer machine as defined in claim 6 including clamping means on said registry frame adapted to clamp said pallet to said support means and actuating means adapted to actuate in sequence said locating means to locate said pallet and thereafter to actuate said clamping means, and said actuating means further supports lift means for said transfer bar means, whereby said pallet is lowered to said support means prior to said sequential locating and clamping of said pallet by said registry means.

8. A multiple station transfer machine as defined in claim 6 in which said actuating means comprises a shaft rotatable about an axis substantially parallel to said Y axis.

9. A multiple station transfer machine as defined in claim 6 in which said lift means comprises rollers adapted to support said transfer bar means in lifted position and to facilitate lineal motion of said transfer bars.

10. A multiple station transfer machine as defined in claim 8 in which said lift means comprises rollers adapted to support said transfer bar means in the lifted position and to facilitate lineal motion of said transfer bar means.

11. In a multiple station transfer machine in which workpieces are supported and located in pallets, and in which said pallets are progressively moved through the stations of said transfer machine by a lift and carry transfer means having a vertical lift means and a horizontal drive means, registry mechanisms for locating and clamping said pallets, each of which comprises:
(a) a registry frame,
(b) support means for said pallet on said registry frame,
(c) locating means on said registry frame to locate said pallet,
(d) clamping means on said registry frame to clamp said pallet to said support means,
(e) rotatable actuating means on each said frame which is substantially integral with said lift means of said transfer means and to actuate in sequence said lift means to lower said transfer means and thereby lower said pallet to said support means, and thereafter to actuate said locating means to locate said pallet, and thereafter to actuate said clamping means to clamp said pallet to said support means.

12. A multiple station transfer machine as defined in claim 11 in which said actuating means comprises a lever mounted on and connected to a shaft rotatable about an axis substantially perpendicular to the direction of pallet transfer and said lift means comprises lift members eccentrically mounted to said rotatable shaft.

13. A multiple station transfer machine as defined in claim 12 in which said lift members comprise rollers on said eccentrically mounted lift members positioned to support said transfer means in lifted position and facilitate lineal motion of said transfer means.

* * * * *